(12) United States Patent
Lai

(10) Patent No.: US 8,065,563 B2
(45) Date of Patent: *Nov. 22, 2011

(54) SYSTEM FOR BOOTING FROM A NON-XIP MEMORY UTILIZING A BOOT ENGINE THAT DOES NOT HAVE ECC CAPABILITIES DURING BOOTING

(75) Inventor: Ming-Shiang Lai, Hsin-Chu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 224 days.

This patent is subject to a terminal disclaimer.

(21) Appl. No.: 12/470,487

(22) Filed: May 22, 2009

(65) Prior Publication Data
US 2009/0235125 A1 Sep. 17, 2009

Related U.S. Application Data

(63) Continuation-in-part of application No. 11/277,349, filed on Mar. 23, 2006, now Pat. No. 7,555,678.

(51) Int. Cl.
*G06F 11/00* (2006.01)
(52) U.S. Cl. .............................. 714/36; 713/2
(58) Field of Classification Search ............. 714/36; 713/1, 2
See application file for complete search history.

(56) References Cited

U.S. PATENT DOCUMENTS

| | | | |
|---|---|---|---|
| 5,581,768 A | 12/1996 | Garney | |
| 6,145,069 A | 11/2000 | Dye | |
| 6,185,696 B1 * | 2/2001 | Noll | 714/6 |
| 6,327,106 B1 | 12/2001 | Rothberg | |
| 6,421,792 B1 * | 7/2002 | Cromer et al. | 714/36 |
| 6,446,203 B1 | 9/2002 | Aguilar | |
| 6,459,624 B1 | 10/2002 | Kuo | |
| 6,591,376 B1 | 7/2003 | VanRooven | |
| 6,601,167 B1 | 7/2003 | Gibson | |
| 6,611,912 B1 | 8/2003 | Maleck | |
| 6,711,059 B2 | 3/2004 | Sinclair et al. | |
| 6,892,323 B2 | 5/2005 | Lin | |
| 7,058,779 B1 | 6/2006 | McClain | |
| 7,073,053 B1 | 7/2006 | Oz | |
| 7,089,414 B2 | 8/2006 | Langford | |
| 7,098,899 B1 | 8/2006 | Ginosar | |
| 7,100,087 B2 | 8/2006 | Yang | |
| 7,120,730 B2 | 10/2006 | Maleug | |

(Continued)

FOREIGN PATENT DOCUMENTS

EP 1 607 865 12/2005

(Continued)

*Primary Examiner* — Marc Duncan
(74) *Attorney, Agent, or Firm* — Winston Hsu; Scott Margo

(57) ABSTRACT

A booting system includes: a non-XIP memory, for storing a plurality of booting images, wherein the booting images comprise a source image and a plurality of duplicates of the source image; an XIP memory, coupled to the non-XIP memory; and a code shadowing module, coupled to the non-XIP memory and the XIP memory, for shadowing a specific booting image to the XIP memory if no errors are detected when carrying out error detection (EDC) checking on the specific booting image; wherein if at least a specific part of a booting image does not pass EDC checking, the code shadowing module shadows error-free parts of the booting image to the XIP memory, carries out EDC checking on at least a duplicate of the specific part, and then shadows an error-free part corresponding to the specific part to the XIP memory.

22 Claims, 4 Drawing Sheets

U.S. PATENT DOCUMENTS

| | | |
|---|---|---|
| 7,143,275 B2 | 11/2006 | Cepulis |
| 7,159,091 B1 | 1/2007 | Hatalkar |
| 7,234,051 B2 | 6/2007 | Munguia |
| 7,243,856 B2 | 7/2007 | Agami |
| 7,295,463 B2 | 11/2007 | Yang |
| 7,295,479 B2 | 11/2007 | Yoon |
| 7,302,517 B2 | 11/2007 | Lim |
| 7,308,567 B2 | 12/2007 | Yamamoto |
| 7,318,173 B1 | 1/2008 | Falik |
| 7,334,179 B2 | 2/2008 | Zhang |
| 7,352,621 B2 | 4/2008 | Rothman |
| 7,360,118 B1 | 4/2008 | Fesler |
| 7,409,539 B2 | 8/2008 | Arnez |
| 7,523,350 B2 * | 4/2009 | Lintz et al. ............ 714/36 |
| 7,555,678 B2 * | 6/2009 | Lai et al. ............ 714/36 |
| 7,765,409 B2 * | 7/2010 | Gafken et al. ............ 713/187 |
| 7,870,378 B2 * | 1/2011 | Kuo et al. ............ 713/2 |
| 2003/0028708 A1 | 2/2003 | Moran |
| 2003/0028760 A1 | 2/2003 | Chang et al. |
| 2003/0172261 A1 | 9/2003 | Lee et al. |
| 2003/0206442 A1 | 11/2003 | Tang |
| 2003/0233533 A1 | 12/2003 | Avraham |
| 2004/0031031 A1 | 2/2004 | Rudelic |
| 2004/0068644 A1 | 4/2004 | Hutton et al. |
| 2004/0076069 A1 | 4/2004 | Voth et al. |
| 2004/0153724 A1 | 8/2004 | Nicholson |
| 2004/0193864 A1 | 9/2004 | Tsai |
| 2004/0199825 A1 | 10/2004 | Zeller |
| 2004/0230738 A1 | 11/2004 | Lim |
| 2005/0038983 A1 | 2/2005 | Moran |
| 2005/0080986 A1 * | 4/2005 | Park ............ 711/103 |
| 2005/0207232 A1 | 9/2005 | Delfs |
| 2005/0268077 A1 | 12/2005 | Kuan |
| 2006/0109725 A1 | 5/2006 | Yoon |
| 2006/0143368 A1 | 6/2006 | Lasser |
| 2006/0214005 A1 | 9/2006 | Agami |
| 2007/0014136 A1 | 1/2007 | Ali |
| 2007/0033348 A1 | 2/2007 | Oh |
| 2007/0043938 A1 | 2/2007 | May |
| 2007/0076475 A1 | 4/2007 | Malueg |
| 2007/0094439 A1 | 4/2007 | Kumar |
| 2007/0283130 A1 | 12/2007 | Bolanowski |
| 2008/0026535 A1 | 1/2008 | Yang |
| 2008/0046636 A1 | 2/2008 | Gross |

FOREIGN PATENT DOCUMENTS

| | | |
|---|---|---|
| KR | 10-0534613 | 12/2005 |
| TW | 576965 | 2/2004 |

* cited by examiner

SYSTEM FOR BOOTING FROM A NON-XIP MEMORY UTILIZING A BOOT ENGINE THAT DOES NOT HAVE ECC CAPABILITIES DURING BOOTING

CROSS REFERENCE TO RELATED APPLICATIONS

This application is a continuation-in-part of U.S. application Ser. No. 11/277,349, which was filed on Mar. 23, 2006, and is included herein by reference.

BACKGROUND OF THE INVENTION

The invention relates to booting from a non-XIP memory, and more particularly, to booting from a non-XIP memory utilizing a boot engine that does not utilize ECC capabilities when booting.

Modern communications technology utilizes both NOR flash memories and NAND flash memories. NOR flash memory is an XIP (Execution in Place) memory that supports booting, and allows code to be directly executed. The disadvantage of NOR flash memory, however, is that the density is limited. For storing images and content, particularly in high-end communication devices, NAND flash memory is the preferred option. The advantages of NAND flash memory over NOR flash memory are faster program and write speeds, and a higher density. NAND flash memory, however, is a non-XIP memory, and therefore has to shadow codes to an XIP memory (e.g. a RAM) before booting can take place. Non-XIP memories often suffer from bit-flipping, where a bit is reversed or reported as reversed. Bit-flipping can have serious consequences for a CPU; therefore, when booting from a non-XIP memory, the system will carry out EDC and ECC checks during the code shadowing process.

Booting from a non-XIP memory can be entirely hardware based or a combination of hardware and software. The hardware method is called a boot engine method. The CPU operation is paused by the boot engine through well-known techniques such as gating a clock fed into the CPU or asserting a reset signal to the CPU, and a boot loader code, contained in the non-XIP memory, is shadowed to the XIP memory. The boot loader code is then executed by the boot engine, so Operation System (OS) images stored in the non-XIP memory can be shadowed to the XIP memory. EDC and ECC checks are carried out at the same time. Code shadowing, EDC, and ECC processes are performed by the boot engine After all the codes have been shadowed to the XIP memory, the boot engine re-activates the CPU, which then executes the OS images in the XIP memory. In short, the related art boot engine method utilizes a boot engine, an individual hardware component different from the existing CPU, to handle all booting sequences including hardware initialization, code shadowing, EDC/ECC checking, and OS start-up.

The software method utilizes a ROM that contains the boot loader code. The ROM is mapped at the top of the CPU address space, and also contains a Reset Code. The Reset Code, executed by the CPU, initializes the hardware, and the boot loader code in the ROM is then executed by the CPU. The boot loader code is for shadowing the OS images in the non-XIP memory to the XIP memory. Similar to the functionality of the above boot engine, the boot loader code is further executed to perform EDC and ECC checks at the same time. Once all the images have been shadowed, the CPU will execute the OS images in the XIP memory. In short, the related art software method utilizes a CPU to handle all booting sequences including hardware initialization, code shadowing, EDC/ECC checking, and OS start-up.

The related art software method needs a longer period of time to complete the booting sequence, but is easier to implement. The related art hardware method requires a shorter period of time to complete the booting sequence, but has greater architectural complexity due to the complicated EDC/ECC hardware. It is desired to invent a new and improved booting system having reduced architectural complexity and requiring a shorter period of time to complete the booting sequence.

SUMMARY

It is one of the objectives of the present invention to provide a system for booting from a non-XIP memory that reduces the complexity of the system, and a related method thereof.

A first embodiment of the system comprises: a non-XIP memory, for storing a plurality of booting images, wherein the booting images comprise a source image and a plurality of duplicates of the source image; an XIP memory, coupled to the non-XIP memory; and a code shadowing module, coupled to the non-XIP memory and the XIP memory, for shadowing a specific booting image to the XIP memory if no errors are detected when carrying out error detection (EDC) checking on the specific booting image; wherein if at least a specific part of a booting image does not pass EDC checking, the code shadowing module shadows error-free parts of the booting image to the XIP memory, carries out EDC checking on at least a duplicate of the specific part, and then shadows an error-free part corresponding to the specific part to the XIP memory.

A related method comprises the following steps: providing an XIP memory; carrying out error detection (EDC) checking on at least one booting image in the non-XIP memory, and shadowing a specific booting image from the non-XIP memory to the XIP memory if no errors are detected when carrying out EDC checking on the specific booting image; and if at least a specific part of a booting image does not pass EDC checking, shadowing error-free parts of the booting image to the XIP memory, carrying out EDC checking on at least a duplicate of the specific part, and shadowing an error-free part corresponding to the specific part to the XIP memory.

A second embodiment of the system comprises: a non-XIP memory, for storing a plurality of operation system (OS) images, wherein the OS images comprise a source image and a plurality of duplicates of the source image; an XIP memory, coupled to the non-XIP memory; and a code shadowing module, coupled to the non-XIP memory and the XIP memory, for carrying out error detection (EDC) checking on at least one OS image stored in the non-XIP memory, and shadowing a specific OS image to the XIP memory if no errors are detected when carrying out EDC checking on the specific OS image; wherein if at least a specific part of an OS image does not pass EDC checking, the code shadowing module shadows error-free parts of the OS image to the XIP memory, carries out EDC checking on at least a duplicate of the specific part, and then shadows an error-free part corresponding to the specific part to the XIP memory.

A related method comprises the following steps: providing an XIP memory; carrying out error detection (EDC) checking on at least one OS image in the non-XIP memory, and shadowing a specific OS image from the non-XIP memory to the XIP memory if no errors are detected when carrying out EDC checking on the specific OS image; and if at least a specific part of an OS image does not pass EDC checking, shadowing error-free parts of the OS image to the XIP memory, carrying out EDC checking on at least a duplicate of the specific part, and shadowing an error-free part corresponding to the specific part to the XIP memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
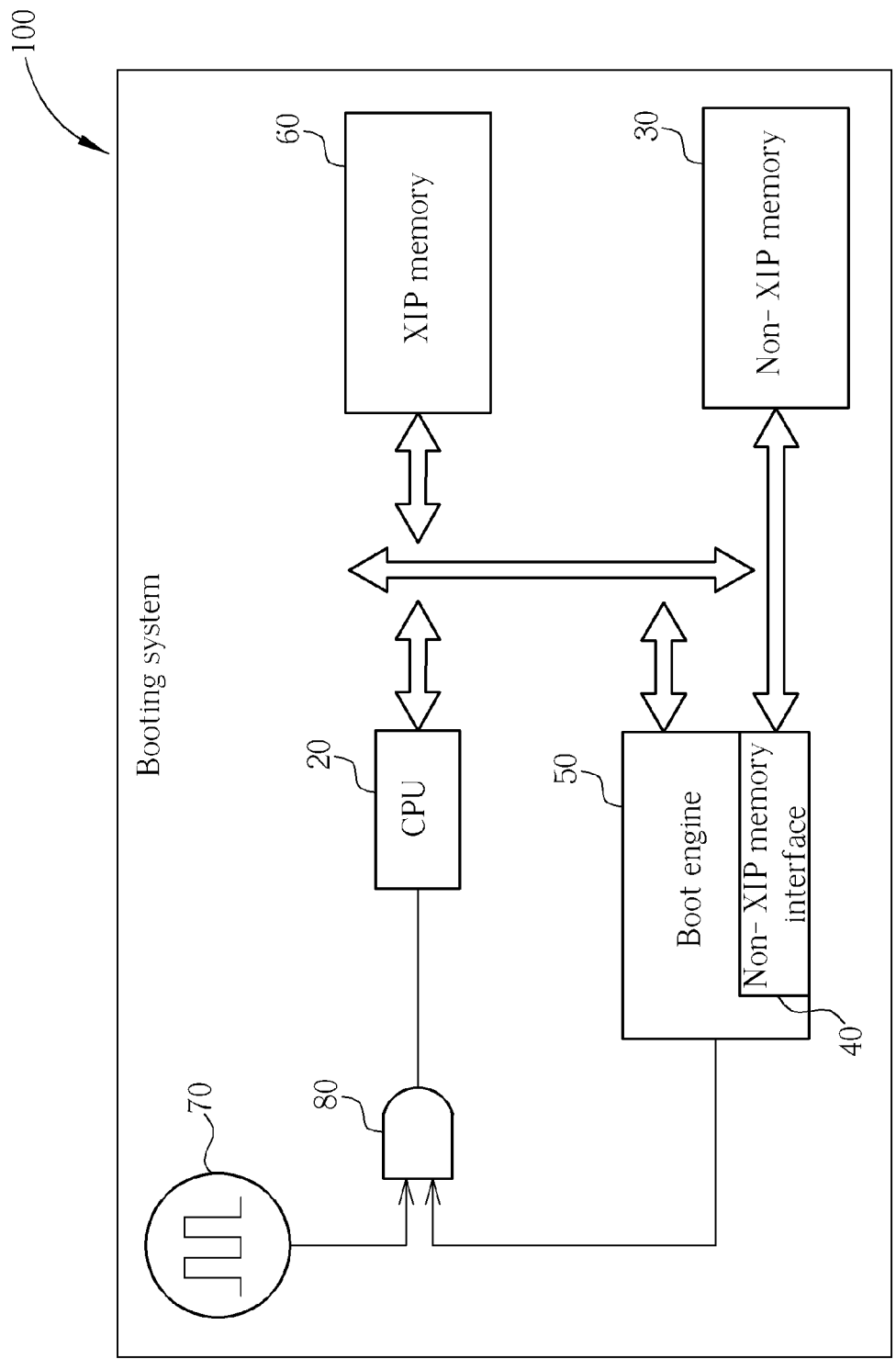
FIG. 1 is a diagram of a booting system for booting from a non-XIP memory according to a first embodiment of the present invention.

Please refer to FIG. 1. FIG. 1 is a diagram of a booting system 100 for booting from a non-XIP memory according to a first embodiment of the present invention. In this embodiment, the booting system 100 comprises a Central Processing Unit (CPU) 20; an XIP memory 60; a boot engine 50; a clock 70; a non-XIP memory 30; and a non-XIP memory interface 40. The non-XIP memory 30 in this embodiment is realized by a non-volatile memory such as a NAND-type serial Flash memory. The XIP memory 60 in this embodiment is realized by a volatile memory such as a Random Access Memory (RAM). Please note this is merely one embodiment of the system and not a limitation. The non-XIP memory 30 stores a boot loader code and a plurality of operation system (OS) images. As the non-XIP memory 30 does not support Execution in Place (XIP), the OS image and boot loader code must first be shadowed to the XIP memory 60 before they can be executed. Please note that in this embodiment, the boot engine 50 only has EDC capabilities during booting and cannot perform ECC checking, so each OS image is duplicated a plurality of times, each duplicate being stored in a different block of the non-XIP memory 30, wherein the duplicates correspond to the same source image. By storing the OS images in different areas of the non-XIP memory 30 to serve as backup images, the chances of a bit being reversed or reported reversed are greatly reduced since the probability of existence of an error-free OS image is increased. Please note the number of times each OS image is duplicated can be determined by the designer and is not a constraint of the booting system 100. Furthermore, it is also possible that the boot loader code itself will have errors; therefore, in some embodiments the boot loader code is also duplicated, and EDC is carried out on at least a specific part of the boot loader code.

When the booting system 100 is initialized, the boot engine 50 is actuated to shadow the boot loader code to the XIP memory 60. During the booting process the CPU 20 is paused by the boot engine 50 using a well-known technique, for example, clock-gating. As shown in FIG. 1, an AND gate 80 serving as a clock-gating apparatus is implemented. Therefore, as the boot engine 50 outputs logic low "0" to the AND gate 80, the output of the AND gate 80 is forced to be logic low "0", thereby gating the clock inputted into the CPU 20. The CPU 20 is re-activated once the boot engine 50 outputs logic high "1" to the AND gate 80 for disabling the clock-gating effect. It should be noted that, as known to those skilled in this art, the clock-gating apparatus can be implemented by other logic gates. The AND gate 80 shown in FIG. 1 is only for illustrative purposes. EDC may then be performed on the shadowed boot loader code. If at least an error is found, a duplicated boot loader code in the non-XIP memory will be shadowed to the XIP memory and the EDC is performed again. This is because the boot engine cannot correct the detected errors. As the boot loader code is duplicated many times, the chances of an error-free code being shadowed are high. Once an error-free code has been successfully shadowed to the XIP memory, the next stage of the operation can proceed.

The boot engine 50 then executes the error-free shadowed boot loader code in the XIP memory 60 for carrying out EDC on one selected OS image and shadowing the selected OS image to the XIP memory 60. The boot engine 50 proceeds to a first block (i.e. a default block) in the non-XIP memory 30 containing a first OS image. In this embodiment, the boot engine 50 only has EDC capabilities during booting, and cannot carry out error correction. If no error is detected, the first OS image will be shadowed to the XIP memory 60 to act as the desired error-free OS image. However, if an error is detected, as the boot engine 50 is not capable of correcting the error it will proceed to a next block in the non-XIP memory 30 that contains a first duplicate of the first OS image. If the duplicate also contains errors, the boot engine 50 will similarly proceed to a next block containing a second duplicate of the first OS image. The duplication of the OS images greatly decreases the likelihood that an OS image will contain errors. Once an OS image duplicate has been found that does not contain errors, the error free image will be shadowed to the XIP memory 60. In short, the EDC checking procedure will continue until both a boot loader code and an OS image are found to be error-free and have been shadowed to the XIP memory 60 completely. At this point the CPU 20 will be activated, and will start to execute the shadowed OS image from the XIP memory 60.

In a preferred embodiment, the boot engine 50 does not have ECC hardware to achieve the objective of simplifying the hardware complexity significantly. However, in an alternative design, the boot engine 50 can still have ECC capacity but the ECC hardware is designed to be disabled during the booting sequence. The disclosed image shadowing process can still be performed correctly, and this alternative design still falls in the scope of the present invention. Moreover, the non-XIP memory interface 40 as shown in FIG. 1 is embedded in the boot engine 50 and coupled to the non-XIP memory 30. The data transfer between the boot engine 50 and the non-XIP memory 30 is through the non-XIP memory interface 40. However, as known to those skilled in this art, the non-XIP memory interface can be implemented as a standalone component positioned between the boot engine 50 and the non-XIP memory 30.

A second embodiment takes account of the fact that if one error exists in the boot loader code and an OS image the whole code/image will have to be discarded. In addition, the larger the size of the OS image, the greater the probability of detecting errors. For example, if a small end part of an OS image having a large size cannot pass EDC, the whole OS image including the previously verified error-free parts will have to be discarded. This causes the boot engine 50 to expend more time on error detection. Therefore, in the second embodiment of the system, the boot loader code and each OS image are further divided into a plurality of parts, and each part is itself duplicated a plurality of times. The duplicated parts are all stored in separate areas of the non-XIP memory 30. The error detection process proceeds through the boot loader code/OS image part by part, with parts of the boot loader code/OS image having errors being discarded and error free parts being shadowed to the XIP memory 60. For example, if an OS image is divided into ten parts and two parts of the OS image are found to have errors, the eight error free parts shadowed to the XIP memory 60 do not need to be replaced. In this case, error detection will only be carried out on the duplicates of the error corrupted parts, rather than on the whole OS image/boot loader code. Error free duplicates of these parts can then be shadowed to the XIP memory 60. In this way, time taken for carrying out EDC is saved.

It is further noted that, in some systems, no boot loader code exists. Instead, the operation of initializing booting is performed by hardware or firmware. In such cases, as no shadowing of the boot loader code is performed, there is no need to duplicate the code.

Figure 2:
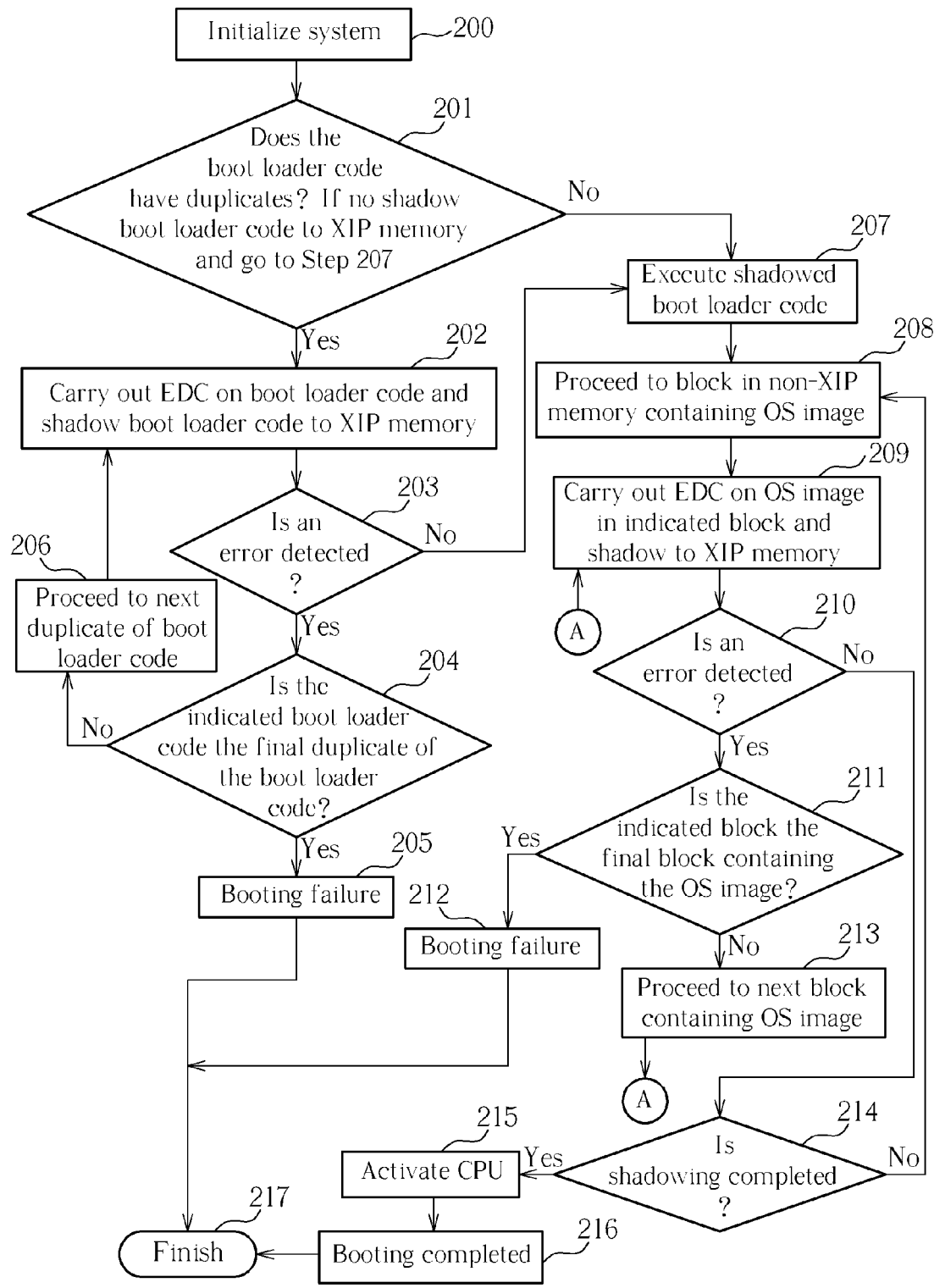
FIG. 2 is a flowchart of a method for booting from a non-XIP memory according to the first embodiment of the present invention.

Please refer to FIG. 2. FIG. 2 is a flowchart illustrating the method of booting from a non-XIP memory according to the first embodiment of the system. For the case where the boot loader code is implemented by firmware or hardware (i.e. the code does not need to be duplicated), the method omits Steps 202~206, and instead proceeds directly with the EDC performed on the OS images. The steps are performed by the booting system 100 shown in FIG. 1 and summarized as follows:

Step 200: Initialize system.
Step 201: Does the boot loader code have duplicates? If yes go to Step 202, if no shadow boot loader code to XIP memory and go to Step 207;
Step 202: Carry out EDC on boot loader code and shadow boot loader code to XIP memory.
Step 203: Is an error detected? If yes go to Step 204, if no go to Step 207;
Step 204: Is the indicated boot loader code the final duplicate of the boot loader code? If yes go to Step 205, if no go to Step 206;
Step 205: Booting failure. Go to Step 217.
Step 206: Proceed to next duplicate of boot loader code, and go to Step 202;
Step 207: Execute shadowed boot loader code.
Step 208: Proceed to block in non-XIP memory containing OS image.
Step 209: Carry out EDC on OS image in indicated block and shadow to XIP memory.
Step 210: Is an error detected? If yes go to Step 211, if no go to Step 214.
Step 211: Is the indicated block the final block containing the OS image? If yes go to Step 212, if no go to Step 213.
Step 212: Booting failure. Go to Step 217.
Step 213: Proceed to next block containing OS image, and go back to Step 209.
Step 214: Is shadowing completed? If yes go to Step 215, if no go back to Step 208.
Step 215: Activate CPU.
Step 216: Booting completed.
Step 217: Finish.

The process is started and the booting system is initialized (Step 200). The boot engine carries out EDC on the boot loader code and shadows the boot loader code to the XIP memory (Step 202). If an error is detected (Step 203), the booting system first determines if the indicated boot loader code is the final duplicate (Step 204), and if this is true the booting will fail (Step 205). If there are more duplicates, the booting system will proceed to the next duplicate (Step 206) for starting a new shadowing and error detection process on the duplicate (Step 202). The boot engine then executes the boot loader code for carrying out EDC and shadowing an OS image to the XIP memory (Step 207). The boot engine proceeds to a block in the non-XIP memory, containing an OS image (Step 208), and then starts performing EDC on the OS image and shadowing the image to the XIP memory (Step 209). If an error is detected (Step 210), the booting system first determines if the indicated block is the final block containing the OS image, i.e. there are no more duplicates (Step 211), and if this is true the booting will fail (Step 212). If there are more duplicates of the OS image that are not accessed yet, the booting system will proceed to the next duplicate (Step 213) in a next block for starting a new shadowing and error detection process on the duplicate OS image (Step 209). If no error is detected, the booting system determines if the shadowing process is complete (Step 214). If not, the process will continue to perform EDC checking and shadowing on the OS image (Step 209). If the process is complete, i.e. one error-free OS image has been shadowed to the XIP memory, the booting system activates the CPU (Step 215). At this point the booting process is complete (Step 216). The process is finished (Step 217).

Figure 3:
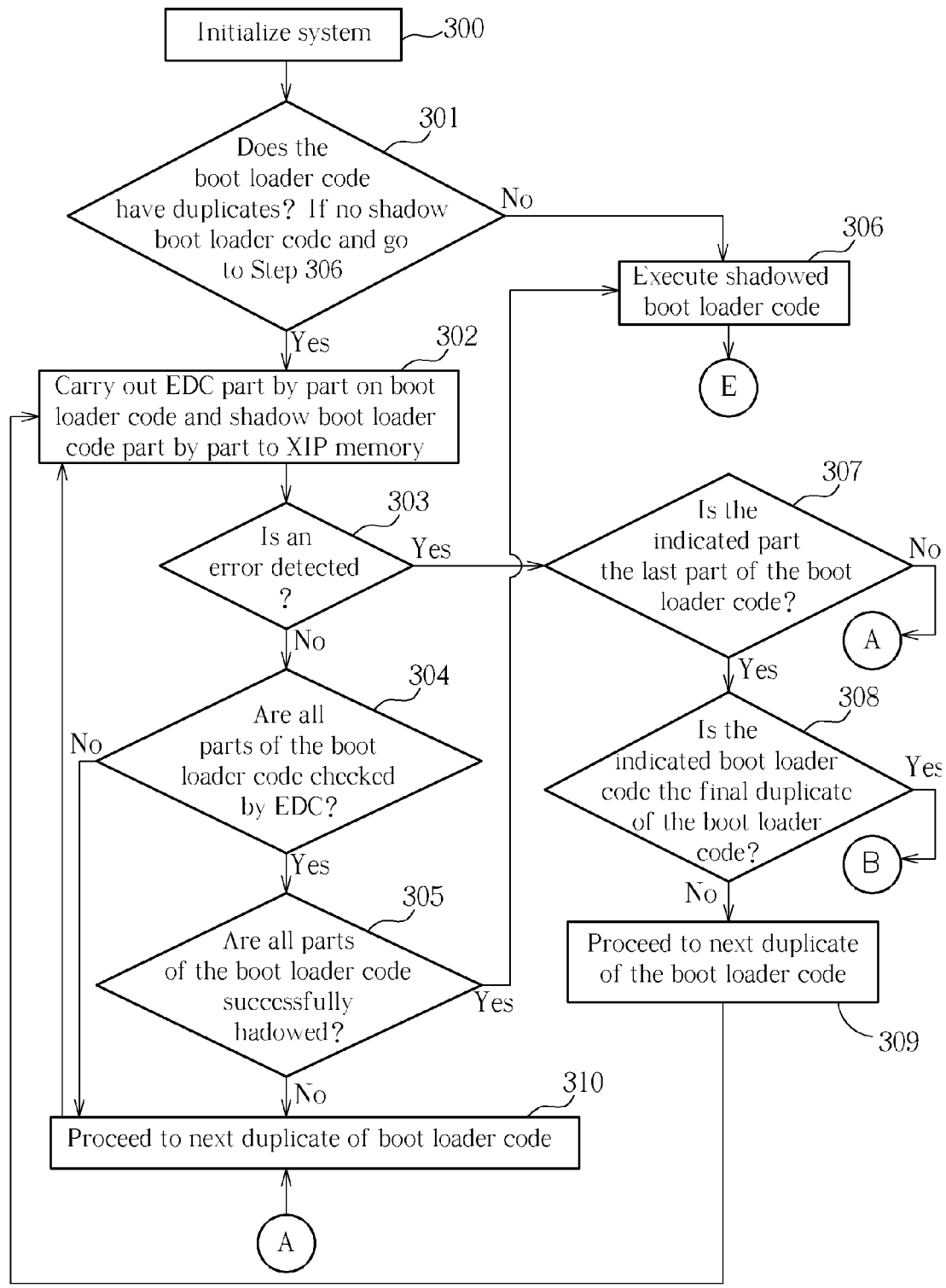
FIG. 3 is a flowchart of a method for booting from a non-XIP memory according to a second embodiment of the present invention.
Figure 4:
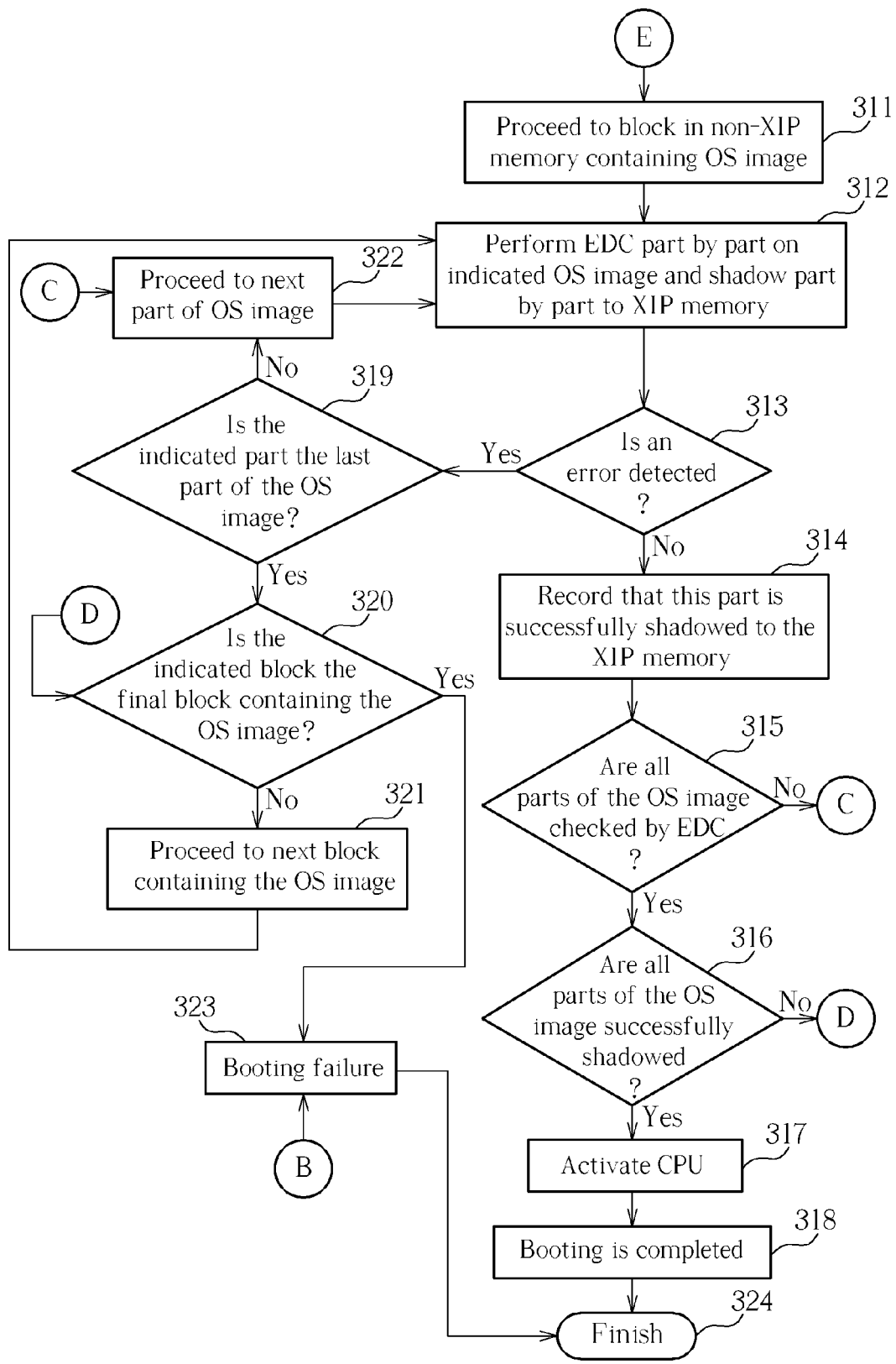
FIG. 4 is a flowchart of a method for booting from a non-XIP memory according to the second embodiment of the present invention.

Please refer to FIGS. 3 and 4. FIGS. 3 and 4 are flowcharts illustrating the method of booting from a non-XIP memory according to the second embodiment of the system. For ease of illustration, the method has been split across the two diagrams. Furthermore, for the case where the boot loader code is implemented by firmware or hardware (i.e. the code does not need to be duplicated), the method omits Steps 301~305 and Steps 307~310, and instead proceeds directly with the EDC performed on the OS images. The steps are performed by the booting system 100 shown in FIG. 1 and summarized as follows:

Step 300: Initialize system
Step 301: Does the boot loader code have duplicates? If yes go to Step 302, if no shadow boot loader code and go to Step 306.
Step 302: Carry out EDC part by part on boot loader code and shadow boot loader code part by part to XIP memory.
Step 303: Is an error detected? If yes go to Step 307, if no go to Step 304.
Step 304: Are all parts of the boot loader code checked by EDC? If yes go to Step 305, if no go to Step 310.
Step 305: Are all parts of the boot loader code successfully shadowed? If yes go to Step 306, if no go to Step 310.
Step 306: Execute shadowed boot loader code. Go to Step 311.
Step 307: Is the indicated part the last part of the boot loader code? If yes go to Step 308, if no go to Step 310.
Step 308: Is the indicated boot loader code the final duplicate of the boot loader code? If yes go to Step 323, if no go to Step 309.
Step 309: Proceed to next duplicate of the boot loader code. Go to Step 302.
Step 310: Proceed to next part of the boot loader code. Go to Step 302.
Step 311: Proceed to block in non-XIP memory containing OS image.
Step 312: Perform EDC part by part on indicated OS image and shadow part by part to XIP memory.
Step 313: Is an error detected? If yes go to Step 319, if no go to Step 314.
Step 314: Record that this part is successfully shadowed to the XIP memory.

Step 315: Are all parts of the OS image checked by EDC? If yes go to Step 316, if no go to Step 322.

Step 316: Are all parts of the OS image successfully shadowed? If yes go to Step 317, if no go to Step 320.

Step 317: Activate CPU.

Step 318: Booting is completed. Go to Step 324.

Step 319: Is the indicated part the last part of the OS image? If yes go to Step 320, if no go to Step 322.

Step 320: Is the indicated block the final block containing the OS image? If yes go to Step 323, if no go to Step 321.

Step 321: Proceed to next block containing the OS image Go to Step 312.

Step 322: Proceed to next part of OS image. Go to Step 312.

Step 323: Booting failure. Go to Step 324.

Step 324: Finish.

The process is started and the booting system is initialized (Step 300). It is first determined if the boot loader code has duplicates (Step 301), wherein if there are duplicates, EDC is performed part by part on the boot loader code and it is shadowed part by part to the XIP memory (Step 302). It is then determined whether an error is detected (Step 303). If an error is detected in a part of the boot loader code it is determined whether that part is the last part of the boot loader code (Step 307). If it is not, the flow proceeds to a next part of the boot loader code (Step 310), and the EDC and shadowing process is repeated. If the part is a last part, it is determined whether the indicated boot loader code is a final duplicate (Step 308). If yes, then there is a booting failure (Step 323). If no, then the boot engine proceeds to a next duplicate of the boot loader code (Step 309), and the EDC and shadowing processes are repeated.

If no error is detected, the boot engine determines whether all parts have been checked by EDC (Step 304) and whether all parts have been successfully shadowed (Step 305). If no, then the flow goes to Step 310. If yes, then the boot engine can execute the shadowed boot loader code (Step 306). If there are no duplicates of the boot loader code, i.e. it is performed by hardware or firmware, then the flow proceeds directly to Step 306 once it is determined that there are no duplicates. The boot engine then proceeds to a block in the non-XIP memory containing an OS image (Step 311).

The boot engine starts performing EDC part by part on the OS image and shadowing the OS image part by part to the XIP memory (Step 312). If an error is detected (Step 313), the booting system will determine if the indicated part is the last part of the currently indicated OS image (Step 319). If this is true, the booting system will then determine if the indicated OS image is the last image, i.e. there are no more duplicates to be accessed (Step 320). If there are no more duplicates of the OS image the booting will fail (Step 323). If the indicated part is not the last part of the OS image, the booting system will proceed to the next part of the OS image (Step 322) for shadowing and carrying out EDC on the indicated part (Step 312). If the indicated part is the last part of the OS image but there are more duplicates of the OS image to be accessed, the booting system will proceed to the next duplicate of the OS image (Step 321). If no error is detected in Step 313, the booting system will determine that the OS image part is successfully shadowed to the XIP memory (Step 314). The booting system then determines if all parts of the indicated OS image have been checked by EDC (Step 315). If this is not true, the booting system will proceed to Step 322. If all parts of the indicated OS image have been checked by EDC, the booting system will then determine if all parts have been successfully shadowed (Step 316). If this is not true, the process will go to Step 320. If all parts have been successfully shadowed to the XIP memory, the booting system will activate the CPU (Step 317). At this point the booting is completed (Step 318). The process is finished (Step 324).

It is an advantage of the present system that the boot engine is made less complex by only utilizing EDC capabilities and not requiring ECC capabilities during booting. It is a further advantage of the system that having a plurality of duplicates of each OS image reduces the possibility of errors occurring. Moreover, the second embodiment of the system, wherein each OS image is divided into a plurality of parts, simplifies the error detection procedure by only performing error detection on a part of the OS image, and avoids the possibility of a whole OS image being discarded due to error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A booting system, comprising:
a non-XIP memory, for storing a plurality of booting images, wherein the booting images comprise a source image and a plurality of duplicates of the source image;
an XIP memory, coupled to the non-XIP memory; and
a code shadowing module, coupled to the non-XIP memory and the XIP memory, for shadowing a specific booting image to the XIP memory if no errors are detected when carrying out error detection (EDC) checking on the specific booting image;
wherein if at least a specific part of a booting image does not pass EDC checking, the code shadowing module shadows error-free parts of the booting image to the XIP memory, carries out EDC checking on at least a duplicate of the specific part, and then shadows an error-free part corresponding to the specific part to the XIP memory.

2. The booting system of claim 1, wherein the booting image comprises an operation system (OS) image and a boot loader code.

3. The booting system of claim 2, wherein if at least a specific part of the boot loader code does not pass EDC checking, the code shadowing module shadows error-free parts of the boot loader code to the XIP memory, carries out EDC checking on at least a duplicate of the specific part, and then shadows an error-free part corresponding to the specific part to the XIP memory.

4. The booting system of claim 1, wherein if the entire booting image does not pass EDC checking, the code shadowing module then carries out EDC checking on a duplicate of the booting image.

5. The booting system of claim 1, further comprising a central processing unit (CPU), coupled to the XIP memory, for executing the shadowed booting image, wherein the code shadowing module is a boot loader engine.

6. The booting system of claim 1, wherein the code shadowing module is a central processing unit (CPU).

7. The booting system of claim 1, wherein the non-XIP memory is a NAND flash.

8. The booting system of claim 7, wherein the NAND flash is a serial flash.

9. The booting system of claim 1, wherein the code shadowing module has no ECC capability.

10. A booting system, comprising:
a non-XIP memory, for storing a plurality of operation system (OS) images, wherein the OS images comprise a source image and a plurality of duplicates of the source image;
an XIP memory, coupled to the non-XIP memory; and a code shadowing module, coupled to the non-XIP memory and the XIP memory, for carrying out error detection (EDC) checking on at least one OS image stored in the non-XIP memory, and shadowing a specific OS image to the XIP memory if no errors are detected when carrying out EDC checking on the specific OS image;

wherein if at least a specific part of an OS image does not pass EDC checking, the code shadowing module shadows error-free parts of the OS image to the XIP memory, carries out EDC checking on at least a duplicate of the specific part, and then shadows an error-free part corresponding to the specific part to the XIP memory.

11. The booting system of claim 10, wherein if the entire OS image does not pass EDC checking, the code shadowing module then carries out EDC checking on a duplicate of the OS image.

12. The booting system of claim 10, further comprising a central processing unit (CPU), coupled to the XIP memory, for executing the shadowed OS image, wherein the code shadowing module is a boot loader engine.

13. The booting system of claim 10, wherein the code shadowing module is a central processing unit (CPU).

14. The booting system of claim 10, wherein the code shadowing module has no ECC capability.

15. A method for booting from a non-XIP memory, the non-XIP memory storing a plurality of booting images, wherein the booting images comprise a source image and a plurality of duplicates of the source image, the method comprising:
providing an XIP memory;
carrying out error detection (EDC) checking on at least one booting image in the non-XIP memory, and shadowing a specific booting image from the non-XIP memory to the XIP memory if no errors are detected when carrying out EDC checking on the specific booting image; and
if at least a specific part of a booting image does not pass EDC checking, shadowing error-free parts of the booting image to the XIP memory, carrying out EDC checking on at least a duplicate of the specific part, and shadowing an error-free part corresponding to the specific part to the XIP memory.

16. The method of claim 15, wherein the booting image comprises an operation system (OS) image and a boot loader code.

17. The method of claim 16, wherein if at least a specific part of the boot loader code does not pass EDC checking, shadowing error-free parts of the boot loader code to the XIP memory, carrying out EDC checking on at least a duplicate of the specific part, and then shadowing an error-free part corresponding to the specific part to the XIP memory.

18. The method of claim 15, further comprising:
if the entire booting image does not pass EDC checking, carrying out EDC checking on a duplicate of the booting image.

19. The method of claim 15, wherein the non-XIP memory is a NAND flash.

20. The method of claim 19, wherein the NAND flash is a serial flash.

21. A method for booting from a non-XIP memory, the non-XIP memory storing a plurality of operation system (OS) images, wherein the OS images comprise a source image and a plurality of duplicates of the source image, the method comprising:
providing an XIP memory;
carrying out error detection (EDC) checking on at least one OS image in the non-XIP memory, and shadowing a specific OS image from the non-XIP memory to the XIP memory if no errors are detected when carrying out EDC checking on the specific OS image; and
if at least a specific part of an OS image does not pass EDC checking, shadowing error-free parts of the OS image to the XIP memory, carrying out EDC checking on at least a duplicate of the specific part, and shadowing an error-free part corresponding to the specific part to the XIP memory.

22. The method of claim 21, further comprising:
if the entire OS image does not pass EDC checking, carrying out EDC checking on a duplicate of the OS image.

* * * * *